United States Patent Office 3,692,500
Patented Sept. 19, 1972

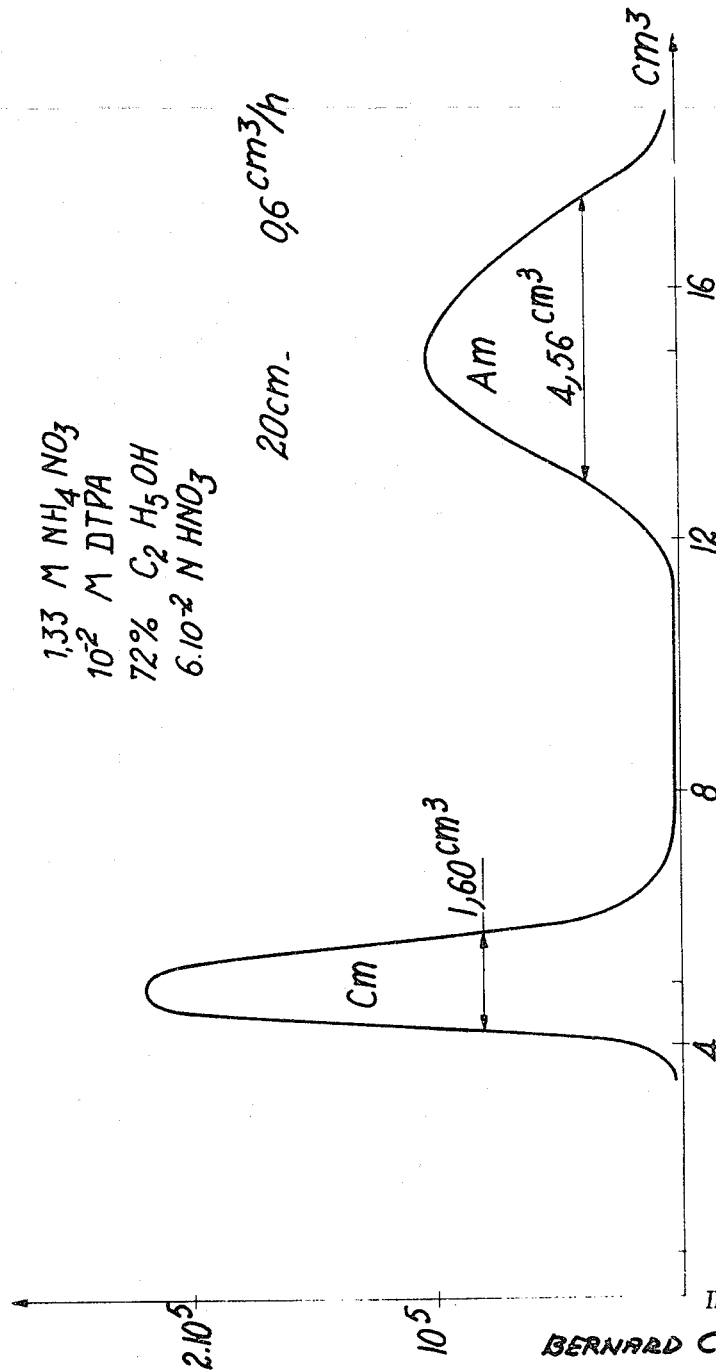

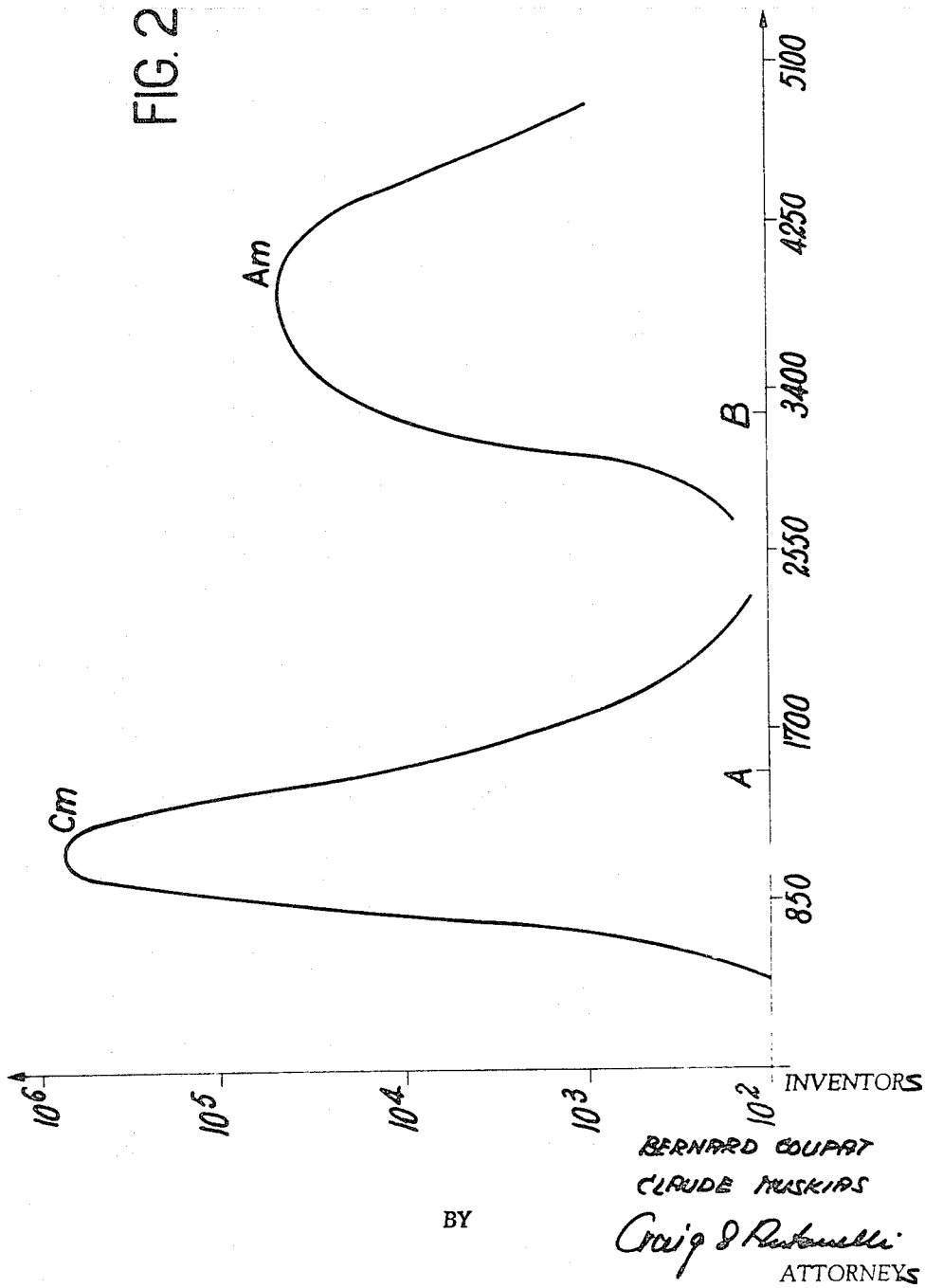

3,692,500
PROCESS FOR THE SEPARATION OF ELEMENTS OF THE LANTHANIDE GROUP AND ELEMENTS OF THE TRANSPLUTONIUM GROUP WHICH ARE PRESENT IN AN AQUEOUS SOLUTION
Bernard Coupat, Montferrand, and Claude Musikas, Bourg-la-Reine, France, assignors to Commissariat a l'Energie Atomique, Paris, France
Filed Nov. 14, 1968, Ser. No. 775,797
Claims priority, application France, Nov. 17, 1967, 128,624
Int. Cl. C01g 56/00
U.S. Cl. 423—7
4 Claims

ABSTRACT OF THE DISCLOSURE

A process for separating the elements of the lanthanide rare-earth group and the elements of the transplutonium group which are present in an aqueous solution. The process comprises adding nitrate ions and an alcohol to the solution to be treated, passing the solution through an anion-exchange resin on which the elements to be separated are adsorbed, eluting the resin with a solution which contains nitrate ions, an alcohol and a complexing agent consisting of an ethyleneaminoacetic acid.

---

The present invention is directed to a process for the separation of elements of the lanthanide rare-earth group and elements of the transplutonium group which are present in an aqueous solution.

These elements which are formed, for example, at the time of irradiation of nuclear fuels are separated from solutions in which they are present either by precipitation or by solvent extraction or alternatively by ion-exchange resins. The process last mentioned is usually preferred to solvent extraction when taking into account the low separation factors of rare earths.

The method of separation by ion-exchange consists in passing the solution to be treated through an ion-exchange resin contained in a column so that the elements to be separated are adsorbed on said resin, in eluting with an aqueous solution and in collecting said elements separately.

The choice of eluent has a predominant influence on the selectivity of the separation. The eluents which have been employed up to the present time required a long elution time in order to achieve a good separation.

A report published in the United States in September 1965 (Report BNWL-69) entitled "Parametric Evaluation of DTPA, EDTA and HEDTA for ion exchange purification of Promethium" by Wheelwright and Myers describes the purification of promethium by adsorption of said element on an ion-exchange resin and elution of said resin with an aqueous solution containing a complexing agent consisting of diethylenetriaminepentaacetic acid, ethylenediaminetetraacetic acid, and hydroxyethylethylenediaminetriacetic acid.

In this process, only the complexing agent plays a part. The process considered consists in carrying out a separation by displacement (the elements have a tendency to undergo displacement at the same time within the column). However, this does not permit of quantitative separation of the elements (overlapping of the elution curves). It is necessary to recycle the end portions. Moreover, the elution times are relatively long.

The process according to the invention comprises adding nitrate ions and an alcohol to the solution to be treated, passing said solution through an ion-exchange resin on which the elements to be separated are adsorbed, eluting said resin with a solution which contains nitrate ions, an alcohol and a complexing agent consisting of ethyleneaminoacetic acid.

In the process according to the invention, the presence of nitrate ions in the eluent plays a critical role. In the case of a given concentration of nitrate ions, the "displacement" separation reported by Wheelwright becomes a separation by elution (one of the elements remains sorbed within the column while the other migrates). Separation by elution permits of quantitative separation of the elements as will become apparent from the examples given hereinafter and from the elution curves relating thereto (which exhibit a well-defined peak in the case of each element).

The addition of an alcohol to the eluent has the property of lowering the concentration of nitrate ions in the eluent.

In other words, in the process which is now proposed, a part is played by each constituent of the eluent, namely nitrate ions, alcohol and complexing agent.

The process in accordance with the invention has the further advantage of permitting selective separation of the elements while reducing elution times.

The first step of the process according to the invention comprises adsorbing the metallic constituents to be separated on the anion-exchange resin, especially of the quaternary ammonium type, which is put in the nitrate form either prior to being placed in the column by any suitable conventional means or in situ within the column by passing a nitric acid or nitrate solution through the resin. Among the resins of the type mentioned which are suited for the purpose, preference is given to the resins produced by the Dow Chemical Company and known by the trade name Dowex-1 and in particular the resins known as Dowex 1X8 which contain approximately 8% divinylbenzene and have a bead diameter between approximately 0.037 and 0.074 mm.

As is well known in the separation technique in which resins are used as ion exchangers, the same base medium is preferably employed for the preparation of the resin, for adsorption and for elution. In the present invention, this base medium is an aqueous medium containing nitrate ions and having an acid concentration which is chosen as a function of the separation to be performed and of the general conditions of the separation, as will be explained hereinafter. The nitrate ions are preferably supplied essentially by ammonium nitrate, the advantage thus gained with respect to the use of lithium nitrate or aluminum nitrate in earlier separation processes of this type being the fact that the constituents to be separatd can readily be detected by $\alpha$-counting or $\alpha$-spectrography. In fact, in the case of the usual concentrated salt media having a lithium nitrate or aluminium nitrate base, the $\alpha$-particles are strongly absorbed even after calcination whereas ammonium nitrate is readily volatilized and does not hinder detection and counting operations in the least degree.

The concentration of alcohol in the eluent can attain 75 wt. percent or more. The choice of alcohol is primarily governed by problems of viscosity of the solution. In the case of ethyl alcohol, it has been found that the optimum quantity was of the order of 72% by weight. The minimum concentration of nitrate ions for a solution of this type is then of the order of 0.9 M.

The influence of the alcohol content on the extraction coefficient $K_D$ and on the separation factor $a$ will be explained hereinafter.

In order to carry out adsorption on the resin, the aqueous solution to be treated which contains essentialy the nitrates of the metals to be separated is passed through the column of anion-exchange resin which is put in the nitrate form, said aqueous solution being preferably completed beforehand in such a manner as to have approximately the composition of the base medium, except for the presence of the salts of the metals to be separated. With this obejctive, the aqueous solution to be treated is usually poured into the appropriate quantity of constituents of the above-mentioned base medium.

Once adsorption has taken place in the usual manner, elution is then carried out with a solution which, in accordance with the invention, contains nitrate ions, an alcohol and a complexing consisting of an ethyleneaminoacetic acid.

For the reasons explained in the foregoing, the elution solution is advantageously constituted by the ammonium nitrate base medium referred-to above, to which is added the desired quantity of complexing agent. The complexing agent referred-to is an ethyleneaminoacetic acid and, for example, diethylenetriaminepentaacetic acid (DTPA).

Elution can be carried out at any temperature between room temperature and the ultimate temperature corresponding to the limit of stability of the complex and complexing agent; in the case of the separation of curium and americium, for example, and with a water-alcohol medium containing 72% by weight of ethyl alcohol, the elution temperature is preferably lower than 70° C. and preferably comprised between 55 and 60° C.

The following table illustrates the influence of the different variables of the elution solution on the extraction coefficient and the separation factor; in this table the variations in the coefficients are given with regard to the assumption that the variable under consideration increases at a constant rate.

| Variable | Extraction coefficient, $K_D$ | Separation factor $a$ |
|---|---|---|
| Alcohol | ↗ | → |
| Nitrate | ↗ | ↗ |
| Complexing agent | ↘ | ↗ |
| Acid concentration | ↗ | ↗ |

It is apparent from the above table that $K_D$ increases with the quantity of alcohol, with the quantity of nitrate and with the acidity but decreases when the quantity of complexing agent increases whilst $a$ is practically not influenced by the quantity of alcohol but increases with the quantity of nitrate (but at a slower rate than $K_D$), with the quantity of complexing agent and with the acidity.

In the case of each separation which is contemplated, it is therefore necessary to choose said variables as a function of the coefficient $K_D$ and factor $a$ which prove to be the most satisfactory.

For example, in the case of the separation of curium and americium, it will be preferable to employ a proportion of ethyl alcohol of approximately 72%, an acid concentration (expressed in $HNO_3$) within the range of $4.5 \times 10^{-2}$ N (below which the separation is poor) to 0.1 N (above which the operation takes too long a time) and a proportion of diethylenetriaminepentaacetic acid within the range of $1 \times 10^{-3}$ M to $5 \times 10^{-2}$ M in respect of an acid concentration of $6 \times 10^{-2}$ N (which is the most favorable value).

In order to avoid the presence of air bubbles in the resin during adsorption and elution, it is an advantage to degas the different solutions before passing them through the resin, for example by heating to 70° C. in the presence of pumice.

The eluent which passes out of the column is then fractionated by any conventional means of suitable type such as, for example, manually or by means of a fraction collector of a type which is well known in this technique. In order to carry out the detection of the constituents in the effluent, it is possible to make use of any method and in particular the method of detection of $\alpha$-radioactivity of its constitutents. An $\alpha$-ray probe unit of known type can be placed, for example, at the base of the column.

When one of the constituents has been completely collected, it is possible and even recommended practice to modify the acid concentration of the eluent and, for example, to reduce said concentration, in order to modify the extraction coefficient and to accelerate the recovery of the following constituent. A few examples of practical application of the invention will now be described by way of non-limitative example.

EXAMPLE 1

The solution to be treated is, in this example, a solution of $Am^{241}$ and $Cm^{244}$ in an 8 M nitrate medium. The activity of this solution is 2,500,000 alpha disintegrations (counts) per $cm.^3$ and per minute.

In the case of all the solutions employed in this example (including the solution to be treated), the ammonium nitrate concentration is 1.33 M and the alcohol content is 72% by weight.

The sorption solution does not contain a complexing agent but only ammonium nitrate, nitric acid and ethyl alcohol. The elution solution additionally contains DTPA at a concentration of $10^{-2}$ M. The acid concentration, as calculated in $HNO_3$, is $6 \times 10^{-2}$ N.

In order to prepare the elution solution, the ammonium nitrate and DTPA are first dissolved in the quantity of 1 N nitric acid which is necessary and a small quantity of distilled water; there are then added 80 $cm.^3$ of ethyl alcohol and the total quantity of 100 $cm.^3$ is made up with distilled water.

The column employed has a height of 20 cms. and contains 1 g. of Dowex 1X8 resin. The column is first washed with the sorption solution referred-to above. When the level of this solution reaches the level of the resin, 0.25 $cm.^3$ of the solution to be treated is introduced by means of a pipette. The solution which remains on the walls of the tube is rinsed twice with a small quantity of sorption solution (approximately 0.25 $cm.^3$).

When the level of the liquid reaches the surface of the resin, the elution solution is added. An amount of 0.5 $cm.^3$ of elution solution is first added in order to complete the rinsing of the solution of Am and Cm which may have remained on the walls of the column. A larger amount of eluent is then added. Elution is carried out at 58° C. and at an effluent flow rate of 0.6 $cm.^3$/hr.

The sorption and elution solutions contain ethyl alcohol. When the operation is carried out at a temperature of the order of 60° C., gaseous bubbles are formed in contact with the resin. In order to circumvent this disadvantage, the solutions are degassed by heating to 70° C. for a period of 20 to 30 minutes in the presence of pumice in order to facilitate the operation.

For the purpose of plotting the elution curve shown in FIG. 1, the effluent was fractionated into portions of predetermined volume by means of a fraction collector.

The Am and Cm in the effluent is detected by virtue of their $\alpha$-radioactivity. Each fraction is suitably diluted and a sample of 20 to 100 $mm.^3$ is deposited on a watch glass. This test sample is evaporated to the dry state, then heated on a meker burner in order to break down the ammonium nitrate. The ammonium nitrate is readily broken down in the hot state, thereby preventing absorption of $\alpha$ particles by the nitrate film which has formed.

Counting is carried out by means of an ionization chamber. The concentration of Am or of Cm is proportional to the number of counts recorded, thereby making it possible to draw the elution curve by plotting as ordinates the number of alpha disintegrations (counts) per $cm.^3$ and per minute and as abscissae the volume of effluent in cm.³. The curve which is shown in the accompanying drawings is thus obtained. Curium passes through first, followed by americium.

Example 2

By adopting the method of operation, the resin and the column of Example 1, there is sorbed at the top of the column 1 cm.³ of Am-Cm solution (1 μg. Cm. and 20 μg. Am) ($10^8$ α disintegrations per minute) in a medium containing: 1.4 M $NH_4NO_3$, 72 wt. percent ethyl alcohol, $6 \times 10^{-2}$ N $HNO_3$.

Rinsing is carried out twice with 0.5 cm.³ of solution containing: $6 \times 10^{-2}$ N $HNO_3$, 1.33 M $NH_4NO_3$ and 72 wt. percent alcohol.

Elution is then carried out with 10 cm.³ of elution solution containing:

| | |
|---|---|
| $NH_4NO_3$ | 1.33 M. |
| Alcohol | 72 percent by weight. |
| $HNO_3$ | $6 \times 10^{-2}$ N. |
| Diethylenetriaminepentaacetic acid | $1 \times 10^{-2}$ M. |

Elution is stopped when the entire quantity of curium has been recovered, this being ascertained by means of an α-ray probe unit which is placed at the bottom of the column.

The elution solution is then modified for the purpose of recovering the americium inasmuch as the acid concentration of this latter has dropped to $1 \times 10^{-2}$ N.

A recovery of approximately 99% of the constituents of the starting mixture is thus achieved with practically total separation of the curium and americium.

It is to be understood that the invention is not limited to the modes of application which have been described in the foregoing and which have been given solely by way of example.

EXAMPLE 3

The treatment is carried out on 100 cm.³ of a solution containing:

| | |
|---|---|
| Americium | 150 mg. |
| Curium | 14 mg. |
| Ethyl alcohol | 72% by weight. |
| $NH_4NO_3$ | 1.3 M. |
| $HNO_3$ | 0.08 N. | in accordance with the method of operation of Example 1.

The column employed has a height of 30 cm. and an internal diameter of 3 cm.

The throughput of this solution within the column is 85 cm.³/hr. The column has previously been washed with 100 cm.³ of a solution containing:

| | |
|---|---|
| Ethyl alchol | 72% by weight. |
| $NH_4NO_3$ | 1.3 M. |
| $HNO_3$ | 0.08 N. |

Elution is carried out with a solution containing:

| | |
|---|---|
| Ethyl alcohol | 72% by weight. |
| $NH_4NO_3$ | 1.3 M. |
| $HNO_3$ | 0.08 N. |
| Diethylenetriaminepentaacetic acid | $2.5 \times 10^{-2}$ N. | with a throughput of 85 cm.³/hr.

The elution curve obtained is shown in FIG. 2 The number of alpha disintegrations (counts) per cm.³ and per minute has been plotted as ordinates and the volume of effluent in cm.³ has been plotted as abscissae.

The americium and curium were recovered with a degree of purity respectively of 99.8 and 100.

EXAMPLE 4

By utilizing the method of operation, the resin and the column of Example 1, there is sorbed at the top of the column 1 cm.³ of a Pm-Eu solution in a medium containing: 1.33 M $NH_4NO_3$, 72 wt. percent ethyl alcohol, $6 \times 10^{-2}$ N $HNO_3$.

The concentrations of Pm and Eu in the solutions treated are comprised between 0 and 3 mg. These two elements are present in these solutions in substantially identical proportions. Washing is carried out with 0.5 cm.³ of a solution containing:

| | |
|---|---|
| $NH_4NO_3$ | 1.33 M. |
| Ethyl alcohol | 72% by weight. |
| $HNO_3$ | $6 \times 10^{-2}$ N. |

Elution is then carried out with 10 cm.³ of an elution solution containing:

| | |
|---|---|
| $HNO_3$ | 0.06 N. |
| $NH_4NO_3$ | 1.33 M. |
| Ethyl alcohol | 80%. |
| Diethylenetriaminepentaacetic acid | 0.01 M. |

Europium appears in the pure state in the effluent at and above 4 cm.³ and is recovered at 99% at 3 cm.³. Promethium is then eluted and recovered.

By way of indication, the partition coefficients of different lanthanide elements between the resin and the solution in the case of the foregoing operating conditions are equal to:

| | |
|---|---|
| Ce (III) | 185 |
| Pm (III) | 26 |
| Eu (III) | 5.0 |
| Tm (III) | 0.7 |

EXAMPLE 5

A treatment is carried out on 100 cm.³ of a Pm-Eu solution in a medium containing 1.3 M $NH_4NO_3$, 0.08 N $NHO_3$, 72 wt. percent ethyl alcohol.

The concentrations of Pm and Eu in the treated solutions can attain 700 mg. These two elements are present in substantially identical proportions in the solutions to be treated.

The operating conditions are those described in Example 3. The column is first washed with 100 cm.³ of a solution containing:

| | |
|---|---|
| Ethyl alcohol | 72% by weight. |
| $NH_4NO_3$ | 1.3 M. |
| $HNO_3$ | 0.08 N. |

Elution is carried out with a solution containing:

| | |
|---|---|
| Ethyl alcohol | 72% by weight. |
| $NH_4NO_3$ | 1.3 M. |
| $HNO_3$ | 0.08 N. |
| Diethylenetriaminepentaacetic acid | $2.5 \times 10^{-2}$ N. |

Elution is stopped when the entire quantity of europium has been recovered. The europium passes through at the same point as the curium (elution curve of FIG. 2).

The elution solution is then modified in order to recover the promethium by raising its acidity to 1 N. The promethium passes between 4.3 and 6.8 liters of eluent.

A recovery of approximately 99% of the constituents of the starting mixture is achieved with practically total separation of the europium and promethium.

What we claim is:

1. A process for separating americium contained in an aqueous solution of transplutonium elements or for separating promethium contained in an aqueous solution of rare earths, comprising:

adding to the starting solution ammonium nitrate up to a concentration of about 1.3 M, ethanol in a proportion of about 72% by weight and nitric acid up to a concentration between $4.5 \times 10^{-2}$ and 0.1 N;

passing this solution through an anion exchanger resin bed which fixes the elements to be separated;

and eluting said resin bed by means of an aqueous solution containing ammonium nitrate in a concentration of about 1.3 M, ethanol in a proportion of about 72% by weight, nitric acid in a concentration between $4.5 \times 10^{-2}$ and 0.1 N, and an ethyleneaminoacetic acid having a concentration of from about $1.0 \times 10^{-3}$ to $5.0 \times 10^{-2}$ M, for successively extracting the different transplutonium or rare earth elements.

2. The process of claim 1 wherein the transplutonium elements to be separated are curium and americium.

3. The process of claim 1 wherein the rare earth elements to be separated are europium and promethium.

4. A process in accordance with claim 1, wherein the ethyleneaminoacetic acid is diethylenetriaminepentaacetic acid.

References Cited

UNITED STATES PATENTS

| | | | |
|---|---|---|---|
| 2,798,789 | 7/1957 | Spedding et al. | 260—429.2 |
| 3,079,225 | 2/1963 | Baybarz | 23—338 |
| 3,161,463 | 12/1964 | Orr | 23—338 |
| 3,275,404 | 9/1966 | Firsching | 23—22 |
| 3,316,066 | 4/1967 | Smit | 23—19 |

OTHER REFERENCES

Jour. of the Amer. Chem. Soc. 82, #16, pp. 4191–4196, August 1960, Sawyer et al.

CARL D. QUARFORTH, Primary Examiner

F. M. GITTES, Assistant Examiner

U.S. Cl. X.R.

210—31, 38; 260—429.1, 429.2; 423—21